United States Patent
Oh (10) Patent No.: US 8,610,527 B2
(45) Date of Patent: Dec. 17, 2013

(54) FIELD COIL ASSEMBLY OF ELECTROMAGNETIC CLUTCH FOR A COMPRESSOR

(75) Inventor: Sungtaeg Oh, Daejeon-si (KR)

(73) Assignee: Halla Visteon Climate Control Corporation, Daejeon (KR)

( * ) Notice: Subject to any disclaimer, the term of this patent is extended or adjusted under 35 U.S.C. 154(b) by 989 days.

(21) Appl. No.: 12/297,223

(22) PCT Filed: Apr. 6, 2007

(86) PCT No.: PCT/KR2007/001695
§ 371 (c)(1),
(2), (4) Date: Oct. 15, 2008

(87) PCT Pub. No.: WO2007/126216
PCT Pub. Date: Nov. 8, 2007

(65) Prior Publication Data
US 2010/0065397 A1    Mar. 18, 2010

(30) Foreign Application Priority Data
May 3, 2006  (KR) .................. 10-2006-0040020

(51) Int. Cl.
*H01F 27/29* (2006.01)
*F16D 27/14* (2006.01)

(52) U.S. Cl.
USPC .................. 336/192; 192/84.96; 335/299

(58) Field of Classification Search
None
See application file for complete search history.

(56) References Cited

U.S. PATENT DOCUMENTS

| | | | |
|---|---|---|---|
| 5,307,038 A * | 4/1994 | Ishimaru | 335/296 |
| 5,508,671 A | 4/1996 | Takashi | |
| 5,812,044 A | 9/1998 | Sakamoto | |
| 6,512,440 B2 * | 1/2003 | Suda | 336/192 |
| 7,138,895 B2 * | 11/2006 | Chung | 335/299 |

FOREIGN PATENT DOCUMENTS

| KR | 20-0123019 Y1 | 9/1998 |
|---|---|---|
| KR | 10-2005-0103694 A | 11/2005 |

* cited by examiner

*Primary Examiner* — Rodney Bonck
(74) *Attorney, Agent, or Firm* — Fulbright & Jaworski LLP (57) ABSTRACT

The present invention relates to a field coil assembly of an electromagnetic clutch for a compressor, more particularly, a field coil assembly of an electromagnetic clutch for a compressor, in which a terminal electrically connected with a field coil portion, and an electric wire are assembled to each other by means of upper and lower holders, and then finally engaged with together by means of an insert molding, thereby simplifying a manufacturing process to reduce manufacturing expense, removing a need for a separate member for protecting an electric wire, and easily adjusting the length of the electric wire.

4 Claims, 8 Drawing Sheets

Fig. 1

Prior Art

Fig. 2

Prior Art

Fig. 3

Prior Art

Fig. 4

Prior Art

FIELD COIL ASSEMBLY OF ELECTROMAGNETIC CLUTCH FOR A COMPRESSOR

This application is a §371 of PCT/KR2007/001695 filed Apr. 6, 2007, which claims priority from Korean Patent Application No: 10-2006-0040020 filed May 3, 2006.

TECHNICAL FIELD

The present invention relates to a field coil assembly of an electromagnetic clutch for a compressor, more particularly, to a field coil assembly of an electromagnetic clutch for a compressor, in which a terminal electrically connected with a field coil portion, and an electric wire are assembled to each other by means of upper and lower holders, and then finally engaged with together by means of an insert molding, thereby simplifying a manufacturing process to reduce manufacturing expense, removing a need for a separate member for protecting an electric wire, and easily adjusting the length of the electric wire.

BACKGROUND ART

Figure 1:
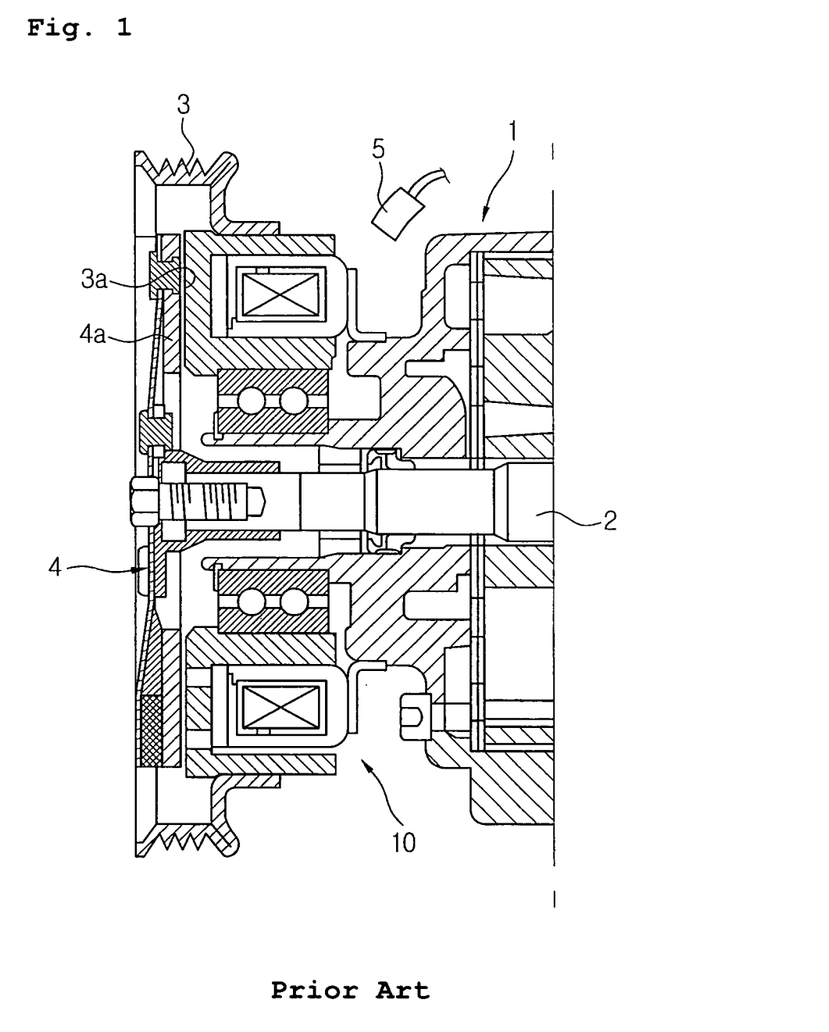
FIG. 1 is a partial cross-sectional view showing a general compressor.

In general, a field coil assembly of an electromagnetic clutch for a compressor is an electric device that transmits a driving force of a pulley rotated by an engine to a disk 4a of a hub 4 engaged with a driving shaft 2 of a compressor 1, by producing a magnetic field by means of electromagnetic induction of an electromagnetic coil at the time of the supply of the electric power, and allowing the disk 4a of the hub 4 engaged with the driving shaft 2 of the compressor 1 to be suctioned to the side of a frictional surface 3a of the pulley 3 by the magnetic force to dynamically be connected to it.

Instantly, it functions to control the operation of the cooling system of an air conditioning device by regulating the power supplied to the compressor according to the application of the electric power to the electromagnetic coil.

As shown in FIGS. 1 to 4, the field coil assembly of an electromagnetic clutch for a compressor comprises a field coil portion 10a and a sleeve 21, and the field coil portion 10a includes an electromagnetic coil body 11 formed of electromagnetic coils wound into a ring shape, a bobbin 12 formed with a projection 12a to expose a pair of coil lines 11a withdrawn from the electromagnetic coil body 11 and instantly receiving the electromagnetic coil body 11, a core ring 15 for accommodating the bobbin 12 receiving the electromagnetic coil body 11 and inserted into the pulley 3, thereby being secured to the compressor 1, and a cover 13 for tightly closing an open surface of the core ring 15 so that the electromagnetic coil body 11 and the bobbin 12 are not separated from the core ring 15.

Figure 2:
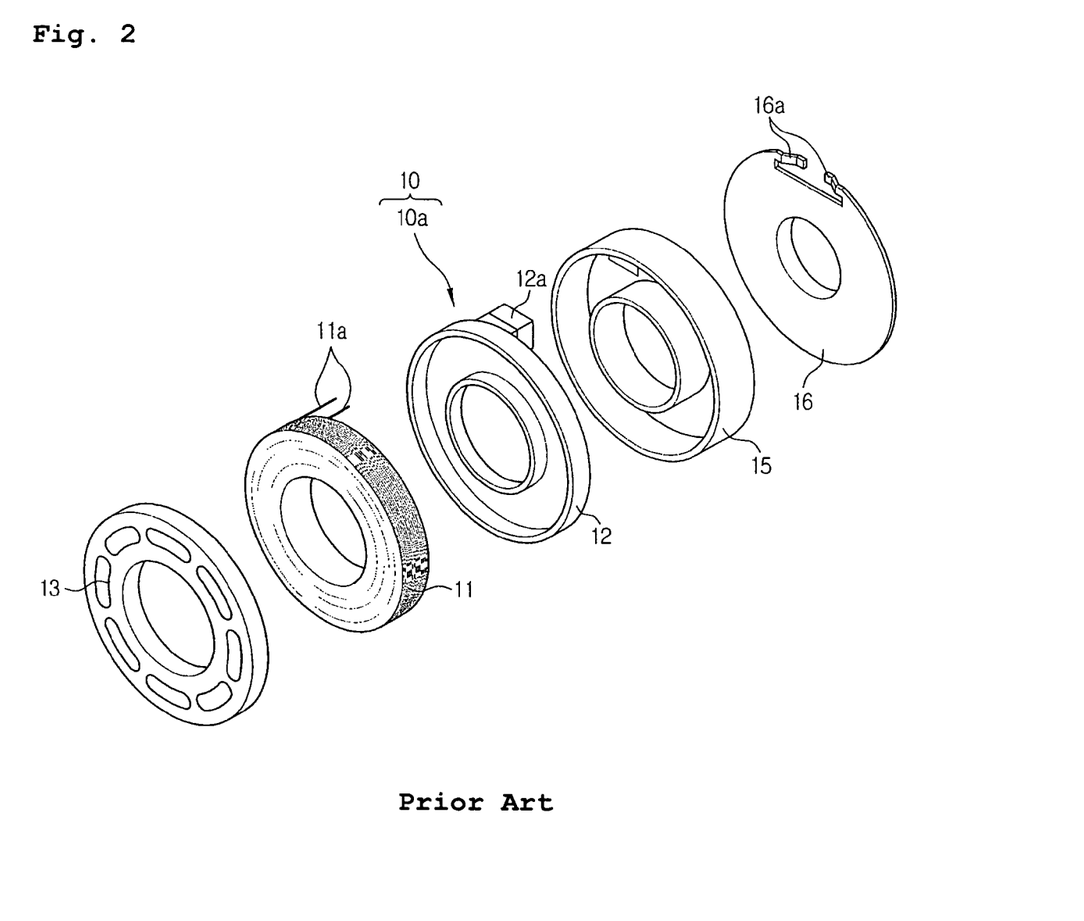
FIG. 2 is an exploded perspective view showing an exploded state of a field coil portion in a conventional field coil assembly of an electromagnetic clutch.

Also, a flange 16 is engaged with one side of the core ring 15, and the flange 16 is formed with locking portions 16a at both sides of the pair of coil lines 11a.

Figure 3:
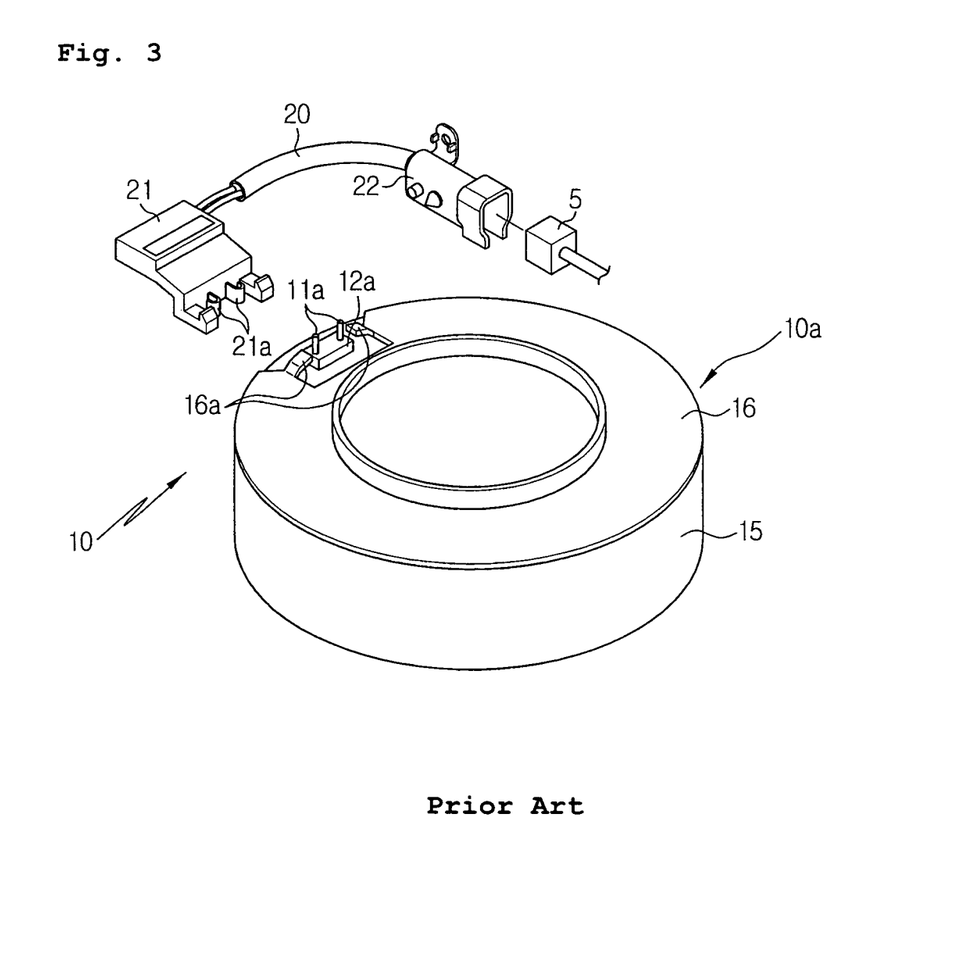
FIG. 3 is a perspective view showing a separated state of a sleeve from a locking portion of a field coil portion in the conventional field coil assembly of an electromagnetic clutch.

In addition, the sleeve 21 is engaged with the locking portions 16a of the field coil portion 10a, and a terminal 21a is mounted at the inside of the sleeve 21 in such a manner as to be electrically connected at one end thereof to an end of electric wire 20 and connected at the other end thereof to the coil lines 11a so as to cause an external power source to be connected to the electromagnetic coil body 11.

Herein, the sleeve 21 is disposed at one end of the electric wire 20, and a connector 22 is disposed at the other end of the electric wire so that it can be connected to a separate connector 5 for supplying the external electric power therethrough.

In other words, the sleeve 21 and the connector 22 are formed at both ends of the electric wire 20 by molding both ends of the electric wire 20 with resin after injecting the electric wire 20 into an injection mold. In this instance, the sleeve 21 is formed by performing the insert-molding of the terminal 21a into one end of the electric wire 20 after it is previously secured.

Figure 4:
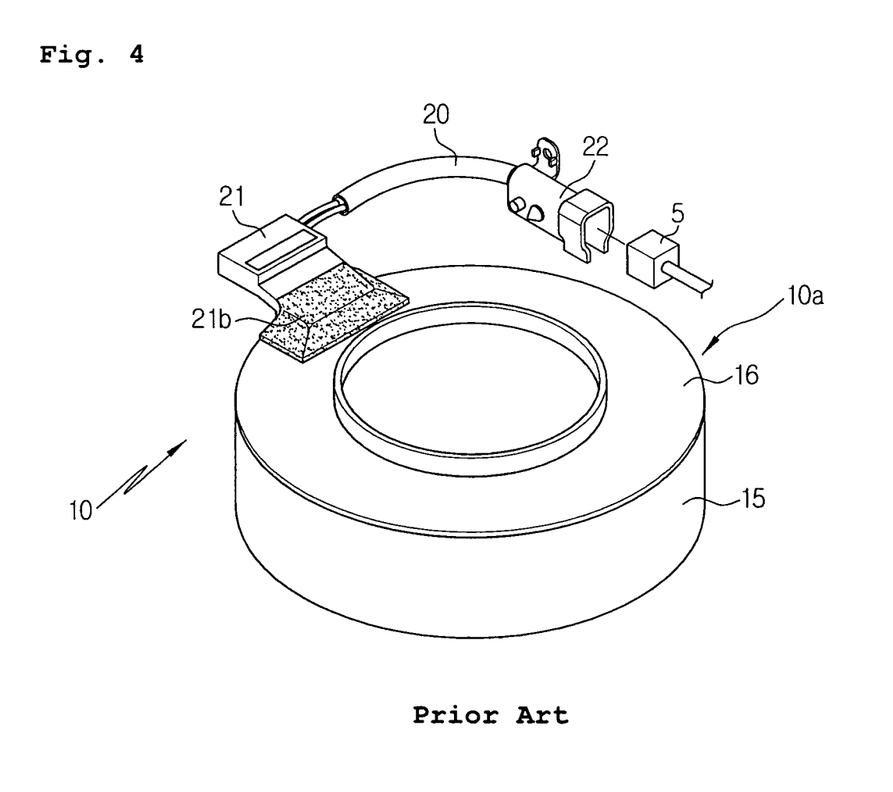
FIG. 4 is a perspective view showing an insert-molded state of a sleeve after engaged with locking portions of a field coil portion in the conventional field coil assembly of an electromagnetic clutch.

Thus, the sleeve 21, which is performed of the insert-molding into one end of the electric wire 20, is engaged with the locking portions 16a of the field coil portion 10a. In this instance, a product is manufactured by finally performing the insert-molding of a connection portion of the terminal 21a and the coil lines 11a so that it is not exposed to the outside, because the terminal 21a and the coil lines 11a are electrically connected to each other.

Accordingly, it is possible to produce a magnetic field at the electromagnetic coil body 11 by connecting the connector 22 of the electric wire 20 to the separate connector 5 connected to the external power source.

Meanwhile, in the field coil assembly 10 of the electromagnetic clutch, when the supply of the electric power to the electromagnetic coil body 11 is interrupted, surge voltage and reverse electromotive force are generated at the electromagnetic coil body 11, thereby causing bad affects such as occurrence of shortening, and the like to the surrounding other electric and electronic products.

Accordingly, it is possible to maintain the voltage at normal state by preventing the generation of the surge voltage and the reverse electromotive force by disposing a diode (not shown) or a register (not shown) at the inside of the sleeve 21 or the connector 22 or at the electric wire 20.

However, conventionally, the electric wire 20 was injected into the injection mold to form the sleeve 21 at one end of the electric wire 20. In this instance, there occurred problems that the electric wire 20 was sometimes pierced by the mold during the injection molding, thereby damaging the electric wire 20 and the cladding of the electric wire in addition to the increase of the disorder ratio due to the injection disorder, and the like.

Moreover, there occurred a problem that manufacturing expense such as material expense, or labor expense, and the like was increased, because a separate member such as contraction tube, and the like should be additionally assembled to an outer shell of the electric wire 20 to protect the electric wire 20.

Furthermore, since both ends of the electric wire 20 should be performed of the injection-molding instantly with the sleeve 21 and the connector 22, it was difficult to adjust the length of the electric wire 20. In other words, conventionally, there also occurred a problem that a separate accommodating structure should be formed in the injection molding according to the length of the electric wire 20 to adjust the length of the electric wire 20.

DISCLOSURE OF INVENTION

Technical Problem

Accordingly, the present invention has been made to solve such conventional problems, and an object of the present invention is to provide a field coil assembly of an electromagnetic clutch for a compressor, in which a terminal electrically connected with a field coil portion, and an electric wire are assembled to each other by means of upper and lower holders, and then finally engaged with together by means of an insert molding, thereby simplifying a manufacturing process to reduce manufacturing expense, removing a need for a separate member for protecting an electric wire, and easily adjusting the length of the electric wire.

Technical Solution

To achieve the above object, the present invention provides a field coil assembly of an electromagnetic clutch for a compressor, comprising:

a field coil portion provided with an electromagnetic coil body formed of electromagnetic coils wound into a ring shape, coil lines withdrawn from an upper side of the electromagnetic coil body, and locking portions formed protrudingly at both sides of the coil lines;

a sleeve engaged with the locking portions, the sleeve being molded with resin at the upper side thereof; and a terminal mounted at the inside of the sleeve and adapted to be connected at one end thereof to an end of an electric wire and at the other end thereof electrically connected to the coil lines so as to cause an external power source to be connected to the electromagnetic coil body;

wherein the sleeve comprises a lower holder engaged with the locking portions by means of a first engagement means, the terminal being disposed on the top surface of the lower holder, and an upper holder engaged with the upper side of the lower holder by means of a second engagement means 124 for securing the terminal and the electric wire.

MODE FOR THE INVENTION

Hereinafter, the preferred embodiment of the present invention will be described in detail with reference to the appended drawings.

In the present invention, repeated explanations about the identical construction and action thereof are omitted for the purpose of simplification of the description of the present invention.

Figure 5:
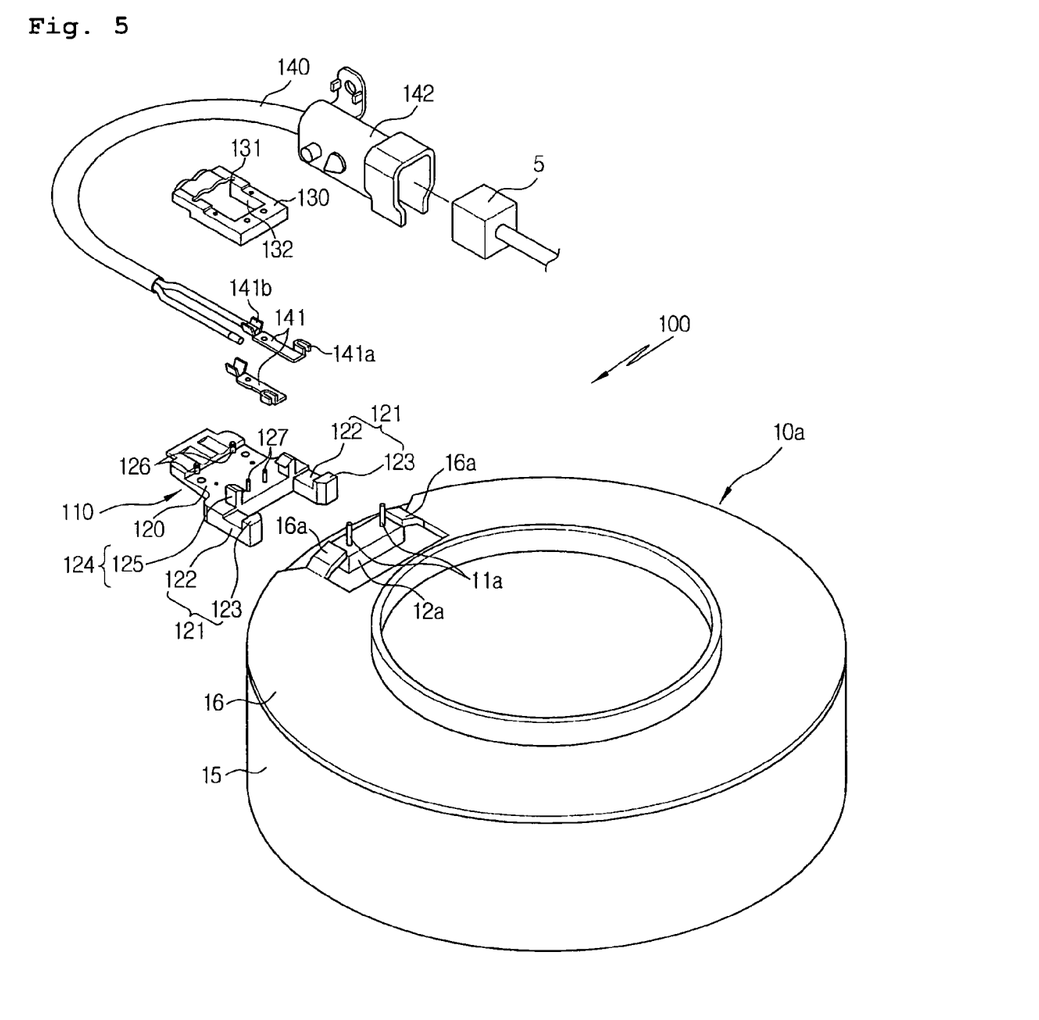
FIG. 5 is an exploded perspective view showing a field coil assembly of an electromagnetic clutch according to the present invention.
Figure 6:
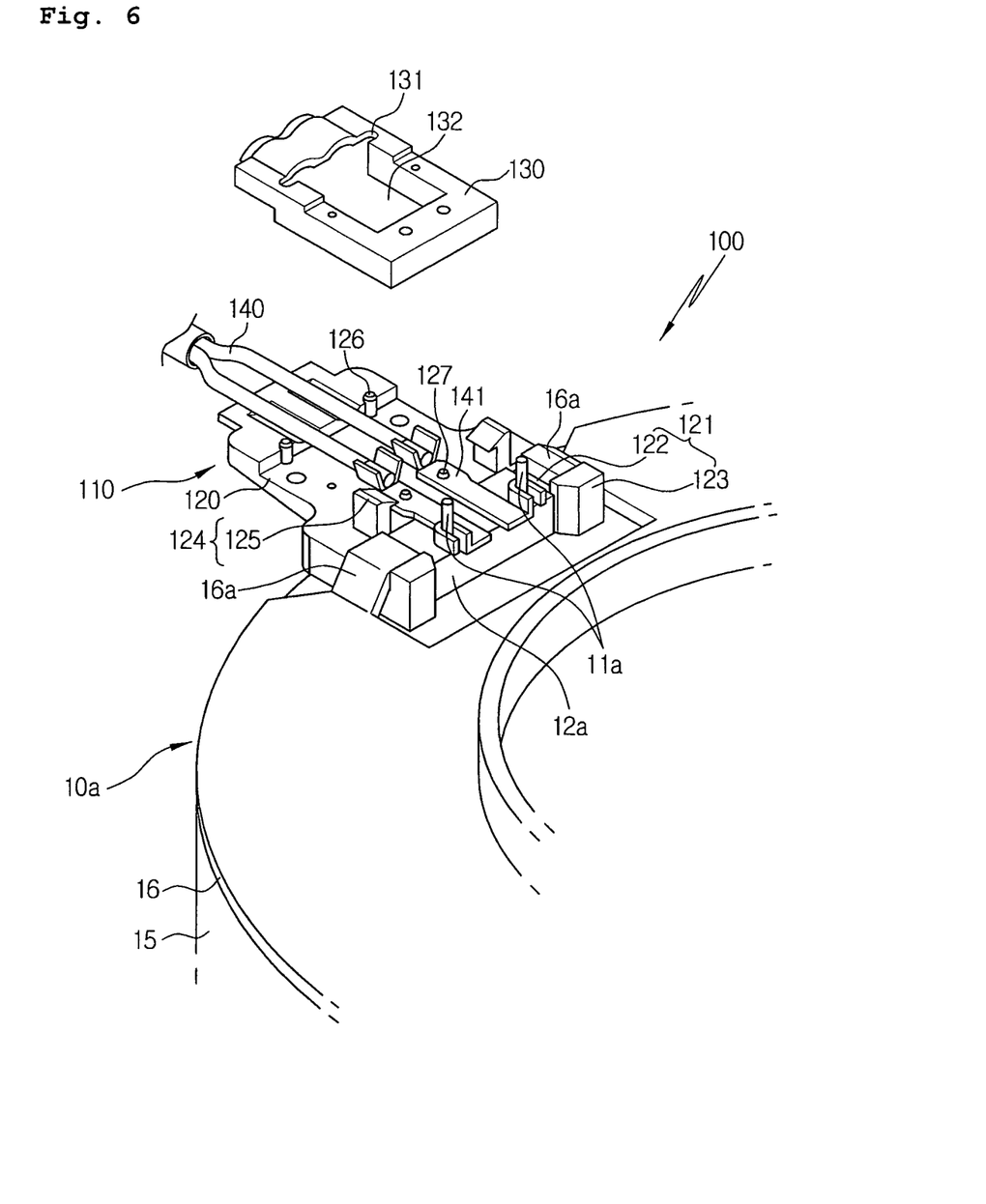
FIGS. 6 through 8 are perspective views showing a process of assembling the sleeve into the locking portions of the field coil portion in the field coil assembly of the electromagnetic clutch according to the present invention.
Figure 7:
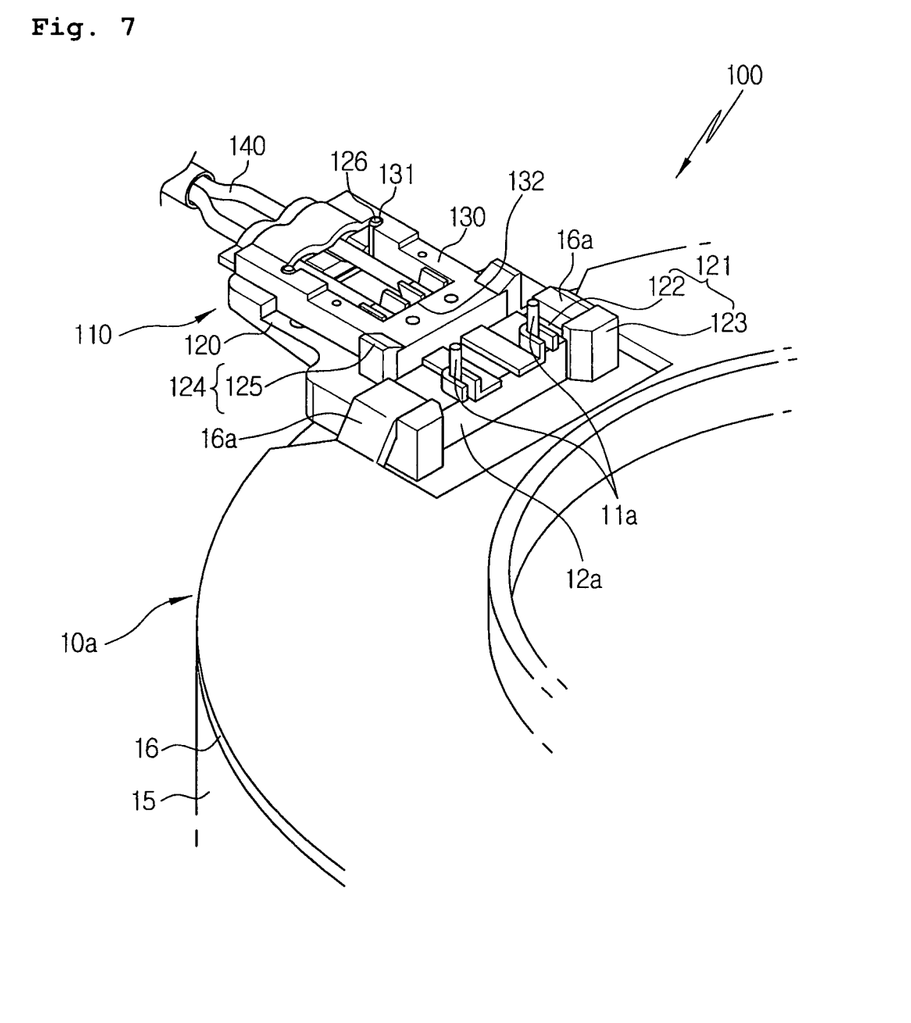
Figure 8:
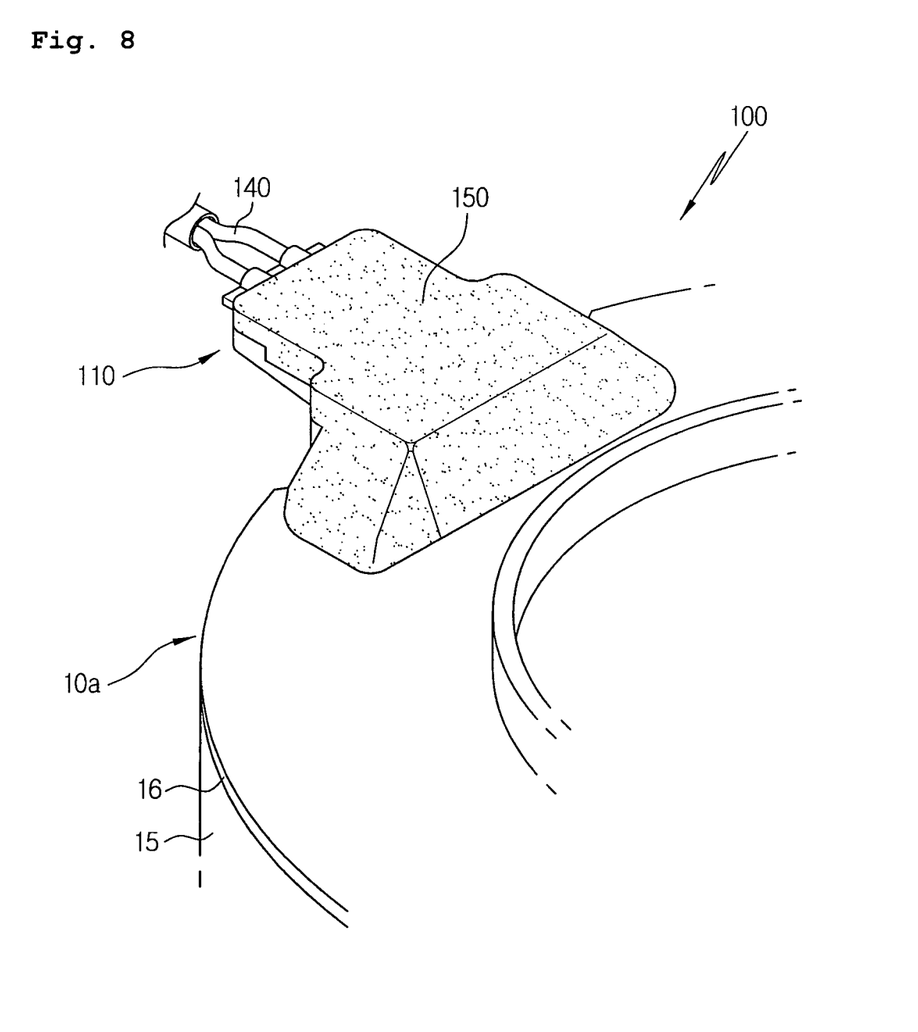

In the drawings, FIG. 5 is an exploded perspective view showing a field coil assembly of an electromagnetic clutch according to the present invention, and FIGS. 6 through 8 are perspective views showing a process of assembling the sleeve into the locking portions of the field coil portion in the field coil assembly of the electromagnetic clutch according to the present invention.

As shown in the drawings, a field coil assembly 100 of an electromagnetic clutch for a compressor according to the present invention comprises a field coil portion 10a and a sleeve 110, and the field coil portion 10a comprises, as shown in the conventional drawings, an electromagnetic coil body 11 formed of electromagnetic coils wound into a ring shape, a bobbin 12 formed with a projection 12a to expose a pair of coil lines 11a withdrawn from the electromagnetic coil body 11 and instantly accommodating the electromagnetic coil body 11, a core ring 15 for accommodating the bobbin 12 receiving the electromagnetic coil body 11 and inserted into the pulley 3, thereby being secured to the compressor 1, and a cover 13 for tightly closing an open surface of the core ring 15 so that the electromagnetic coil body 11 and the bobbin 12 are not separated from the core ring 15.

Also, the core ring 15 is provided with a flange 16 at one side for engagement with the compressor 1, and the flange 16 is formed with locking portions 16a at both sides of a pair of coil lines 11a so that they protrude.

In addition, the sleeve 110 is engaged with the locking portions 16a and a terminal 141 is mounted at the inside of the sleeve 110 in such a manner as to be connected at one end thereof to an end of electric wire 140 and connected at the other end thereof to the coil lines 11a so as to cause an external power source to be connected to the electromagnetic coil body 11.

Herein, the electric wire 140 is formed at the other end thereof with a connector 142 connected to the separate connector 5 for supplying the external electric power. therethrough Accordingly, the sleeve 110 which is provided at one end of the electric wire 140 is engaged with the locking portions 16a of the field coil portion 10a so as to electrically connect the terminal 141 to the coil lines 11a, and the connector 142 which is provided at the other end of the electric wire 140 is electrically connected to the separate connector 5 connected to the external power source, so that the electric power is supplied to the electromagnetic coil body 11 to produce a magnetic field. Thus, it is possible to control the operation of the cooling system of the air conditioning device by regulating the power supplied to the compressor 1 according to the application of the electric power to the electromagnetic coil body 11.

Hereinafter, the sleeve 110, which is the characteristic of the present invention, will be described in detail.

The sleeve 110 is engaged with the locking portions 16a by means of a first engagement means 121, and comprises a lower holder 120 provided with the terminal 141 connected to one end of the electric wire 140 at an upper side, and an upper holder 130 engaged at the upper side of the lower holder 120 by means of a second engagement means 124 for securing one end of the terminal 141 and the electric wire 140.

In other words, conventionally, while the sleeve 21 was formed by injecting an electric wire 20 into an injection mold and molding it with resin with inserting a terminal 21a into one end of the electric wire 20, the sleeve 110 is designed as an assembly type by being constructed of the lower holder 120 and the upper holder 130, which can be assembled to each other.

As described above, each first engagement means 121 is formed with an engagement portion 122 extending outwardly from one side of the lower holder 120, at which time, first engagement means is formed with a retaining step 123 at the distal end thereof, so that the retaining step can be securely caught by the locking portion 16a while the retaining step is inserted below the locking portion 16a.

Here, the pair of engagement portions 122 are separated from each other by a predetermined interval, and it is preferable that the separated distance is longer than the length of a projection 12a formed at the bobbin 12.

Accordingly, when the engagement portions 122 of the lower holder 120 are inserted below the locking portions 16a disposed at both sides of the coil lines 11a, the retaining steps 123 formed at the distal ends of the engagement portions 122 are firmly caught by the locking portions 16a so that the lower holder 120 is securely engaged with the locking portions 16a.

Also, the second engagement means 124 is formed with a pair of projecting hooks 125 on the top surface thereof so that both sides of the upper holder 130 can be securely caught by the pair of hooks.

In addition, the lower holder 120 is formed with a projecting guide 126 to prevent the movement at the time of assembling the lower holder 120 with the upper holder 130, and the upper holder 130 is formed with an insertion groove 131 so that the guide 126 can be inserted into it.

Accordingly, when the upper holder 130 is assembled to the lower holder 120, as it is assembled with the insertion of the guide 126 into the insertion groove 131, they can be easily assembled as they cannot be moved, and the upper holder 130 cannot be separated from the lower holder 120 because it is caught by the hook 125 formed at the lower holder 120 after the completion of the assembly. Moreover, when the assembly is completed due to the caught of the upper holder 130 by the hook 125 of the lower holder 120, one side of the upper holder 130 presses and secures the upper side of the terminal 141, and the other side of the upper holder presses and secures the upper side of the end of the electric wire 140.

In this instance, it is preferable that the upper holder 130 is formed with a space portion 132 at the center thereof so that the upper holder cannot interfere with a connection portion of the terminal 141 and the electric wire 140 when it is assembled with the lower holder 120.

Meanwhile, the terminal 141 is formed with a U-shaped connection portion 141a opened in the direction of the coil lines 11a at one end thereof so that it is connected to a pair of coil lines 11a, and is formed with a U-shaped connection portion 141b opened in the upward direction at the other end thereof so that it can be connected to an end of the electric wire 140.

Also, the terminal 141 is engaged by insertion into a projection 127 formed at the lower holder 120 so that it is not moved when it is disposed at the upper side of the lower holder 120.

Then, after the assembly of the terminal 141 and the electric wire 140 by means of the upper and lower holders 130, 120, the sleeve 110 is engaged with the locking portions 16a of the field coil portion 10a, and then the upper side of the sleeve 110 is finally insert-molded with resin 150.

Thus, since the sleeve 110 is molded with the sleeve engaged with the locking portions 16a, an outer appearance of the sleeve 110 becomes graceful and the ends of the coil lines 11a, the terminal 141 and the electric wire 140 which are electrically interconnected are not exposed to the outside.

Meanwhile, in the field coil assembly 100 of the electromagnetic clutch, when the supply of the electric power to the electromagnetic coil body 11 is interrupted, it is preferable to dispose a diode (not shown) or a register (not shown) at the inside of the sleeve 110 or the connector 142, or at the electric wire 140 to prevent the surge voltage and the reverse electromotive force, thereby maintaining the voltage at normal state. Herein, as the technology of disposing the diode and the register has been well known, detailed description thereof will be omitted.

As described above, the field coil assembly 100 of the electromagnetic clutch for the compressor according to the present invention is constructed that the terminal 141 and the electric wire 140 are disposed on the upper side of the lower holder 120 at the connection state. As a result, the terminal 141 is inserted into the projection 127 formed at the lower holder 120 so that it is prevented from moving at this time.

Then, the upper holder 130 is assembled to the lower holder 120. In this instance, both sides of the upper holder 130 are caught by the hook 125 formed at the lower holder 120, so that the upper holder is secured to the lower holder.

Thus, the sleeve 110, which is constructed of the upper and lower holders 130 and 120 with the terminal 141 and the electric wire 140 being assembled therebetween is engaged with the locking portions 16a of the field coil portion 10a. In other words, the engagement portions 122 of the lower holder 120 are inserted below the locking portions 16a so that the retaining steps 123 of the engagement portions 122 is caught by the locking portions 16a, thereby securely engaging the sleeve 110 with the locking portions 16a.

Then, a product is manufactured by finally being insert-molded of the upper side of the sleeve 110 in the injection mold with resin after the sleeve 110 is engaged with the locking portions 16a.

As described above, according to the present invention, manufacturing can be facilitated and the manufacturing expense can be reduced by constructing the sleeve 110 provided at one end of the electric wire 140 to be assembled by means of the upper and lower holders 130, 120, instead of making it by means of the conventional insert-molding. Also, it is possible to adjust the length of the electric wire 140 according to its requirement, as the sleeve 110 is assembled to one end of the electric wire 140.

Industrial Applicability

As described above, according to the present invention, as the sleeve is constructed by assembling the terminal and the electric wire by means of the upper and lower holders and is manufactured by engaging with the locking portions of the field coil portion and then performing the insert-molding, it is possible to simplify the manufacturing process and reduce the manufacturing expense.

Also, as the sleeve is constructed to be assembled by means of the upper and lower holders instead of performing the insert-molding at the inside of the injection mold, it is easy to manufacture the sleeve, a separate member is not required to protect the electric wire, and it becomes easy to adjust the length of the electric wire.

The invention claimed is:

1. A field coil assembly of an electromagnetic clutch for a compressor, comprising:
    a field coil portion provided with an electromagnetic coil body formed of electromagnetic coils wound into a ring shape, coil lines withdrawn from an upper side of the electromagnetic coil body, and locking portions formed protrudingly at both sides of the coil lines;
    a sleeve engaged with the locking portions; and
    a terminal mounted at the inside of the sleeve and adapted to be connected at one end thereof to an end of an electric wire and at the other end thereof electrically connected to the coil lines so as to cause an external power source to be connected to the electromagnetic coil body;
    wherein the sleeve comprises
    a lower holder engaged with the locking portions by means of a first engagement means, the terminal being disposed on a top surface of the lower holder, an upper holder formed with a through opening at a center thereof engaged with an upper side of the lower holder, a second engagement means for securing the terminal and the electric wire, and wherein the field coil assembly further comprises a covering molding portion which is molded on the upper side of a sleeve with resin covering the upper holder of the sleeve and filling in the through opening.

2. The field coil assembly of the electromagnetic clutch for a compressor according to claim 1, wherein the lower holder is formed with a projecting guide on the top surface thereof, for preventing movement of the upper holder and the lower holder and interference of the upper holder and the lower holder with a connection portion of the terminal and the electric wire at the time of the assembly of the upper holder and the lower holder, and the upper holder is formed with an insertion groove at the inside thereof for inserting the guide thereto.

3. The field coil assembly of the electromagnetic clutch for a compressor according to claim 1, wherein the first engagement means is formed with a pair of engagement portions extending outwardly from one side of the lower holder, each of which is formed with a retaining step at the distal end thereof, so that the retaining step can be securely caught by the locking portion while the retaining step is inserted below the locking portion.

4. The field coil assembly of the electromagnetic clutch for a compressor according to claim 1, wherein the second engagement means is formed with a pair of hooks on a top surface thereof so that both sides of the upper holder can be securely caught by the pair of hooks.

* * * * *